United States Patent
Nammi

(10) Patent No.: US 10,567,108 B2
(45) Date of Patent: Feb. 18, 2020

(54) ADAPTIVE CONFIGURATION OF MODULATION AND CODING SCHEME TABLES FOR NEW RADIO

(71) Applicant: AT&T Intellectual Property I, L.P., Atlanta, GA (US)

(72) Inventor: SaiRamesh Nammi, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/932,233

(22) Filed: Feb. 16, 2018

(65) Prior Publication Data

US 2019/0260495 A1    Aug. 22, 2019

(51) Int. Cl.
*H04L 1/00* (2006.01)
*H04W 4/02* (2018.01)

(52) U.S. Cl.
CPC .......... *H04L 1/0003* (2013.01); *H04L 1/0009* (2013.01); *H04L 1/0016* (2013.01); *H04W 4/02* (2013.01)

(58) Field of Classification Search
CPC ... H04L 1/0003; H04L 1/0009; H04L 1/0016; H04W 4/02
See application file for complete search history.

(56) References Cited

U.S. PATENT DOCUMENTS

| | | |
|---|---|---|
| 9,407,417 B2 | 8/2016 | Chen et al. |
| 9,520,963 B2 | 12/2016 | Nammi et al. |
| 9,544,880 B2 | 1/2017 | Song et al. |
| 9,577,862 B2 | 2/2017 | Lee et al. |

(Continued)

FOREIGN PATENT DOCUMENTS

WO    2016/190804 A1    12/2016

OTHER PUBLICATIONS

Yang, et al., "LTE Physical Layer Performance Analysis," US Department of Commerce, National Institute of Standards and Technology, http://dx.doi.org/10.6028/NIST.IR.7986, Dec. 2013, 18 pages.

(Continued)

*Primary Examiner* — Ajay Cattungal

(74) *Attorney, Agent, or Firm* — Amin, Turocy & Watson, LLP

(57) ABSTRACT

The described technology is generally directed towards a network node in a radio communications system adaptively switching the modulation and coding scheme (MCS) table in use by user equipment. The network node evaluates performance data corresponding to one or more performance criteria to determine which MCS table to use. Non-limiting examples of performance data/performance criterion include the current transmission scheme, user equipment cell location, user equipment geometry, the number of transmit and/or receive antennas, the feedback reporting mode, the frequency band used in communications, network node performance, base station transmission power, user equipment deployment scenario, user equipment radio environment, user equipment recommendation, and the type of service being served by the base station. Any of the above performance data/performance criteria can be combined to adaptively make a determination and selection of which modulation and coding scheme table to use.

20 Claims, 15 Drawing Sheets

(56) References Cited

U.S. PATENT DOCUMENTS

| | | | |
|---|---|---|---|
| 9,596,052 B2 | 3/2017 | Pan et al. | |
| 9,831,982 B2 | 11/2017 | Hammarwall et al. | |
| 9,847,849 B2 | 12/2017 | Greenberg et al. | |
| 9,860,091 B2 | 1/2018 | Larsson et al. | |
| 9,871,618 B2 | 1/2018 | Yang et al. | |
| 2007/0121547 A1* | 5/2007 | Huh | H04W 72/10 370/329 |
| 2007/0165589 A1* | 7/2007 | Sakoda | H04W 48/08 370/345 |
| 2013/0315157 A1* | 11/2013 | Krishnamurthy | H04L 5/0053 370/329 |
| 2015/0195818 A1* | 7/2015 | Davydov | H04L 27/3494 370/329 |
| 2015/0312071 A1* | 10/2015 | Chen | H04L 1/0016 370/329 |
| 2016/0036618 A1 | 2/2016 | Einhaus et al. | |
| 2017/0141874 A1 | 5/2017 | Di Taranto et al. | |
| 2017/0171014 A1 | 6/2017 | Chen et al. | |
| 2017/0230153 A1* | 8/2017 | Gao | H04L 5/0032 |
| 2018/0041858 A1 | 2/2018 | Sheng et al. | |

OTHER PUBLICATIONS

International Search Report and Written Opinion received for PCT Application Serial No. PCT/US2019/017139 dated May 14, 2019, 15 pages.

Huawei et al., "MCS table for UL 256QAM", URL: http://www.3gpp.org/ftp/tsg ran/WGl RL1/TSGRI 84b/Docs/, 3GPPTSG RAN WG1 Meeting #84bis, R1-162140, Apr. 11-15, 2016, 6 pages.

\* cited by examiner

US 10,567,108 B2

ADAPTIVE CONFIGURATION OF MODULATION AND CODING SCHEME TABLES FOR NEW RADIO

TECHNICAL FIELD

The subject application is related to wireless communication systems, and, for example, to adaptively configuring the modulation and coding scheme in use for data transmission in a wireless communication system.

BACKGROUND

In new radio, sometimes referred to as 5G, user equipment computes channel estimates based on pilot or reference signals from the 5G system, and computes the parameters needed for channel state information (CSI) reporting. A CSI report, including channel quality indicator (CQI) data, is sent from the user equipment to a network device on demand via a feedback channel on request from the network, and/or the user equipment may be configured to send the CSI report periodically. A network scheduler uses this information in choosing the parameters for scheduling of this particular user equipment. The network sends the scheduling parameters to the user equipment in a downlink control channel. After that, actual data transfer takes place from the network to the user equipment.

In new radio, the network configures the user equipment with which CQI table (Table 2 or 3, widely published) is to be used for CQI reporting using higher layer message signaling. Similarly the network configures the user equipment with which modulation and coding scheme (MCS) table (Table 4 or 5, also widely published) using higher layer message (Radio Resource Control, or RRC) signaling. For MCS table configuration, the network configures the user equipment based on whether the user equipment has the capability to support 256-QAM (Quadrature Amplitude Modulation) or not. That is, if the user equipment is capable of receiving 256-QAM transmissions from the network, the MCS table 5 is configured by the network to be used by the user equipment, otherwise MCS table 4 is configured.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
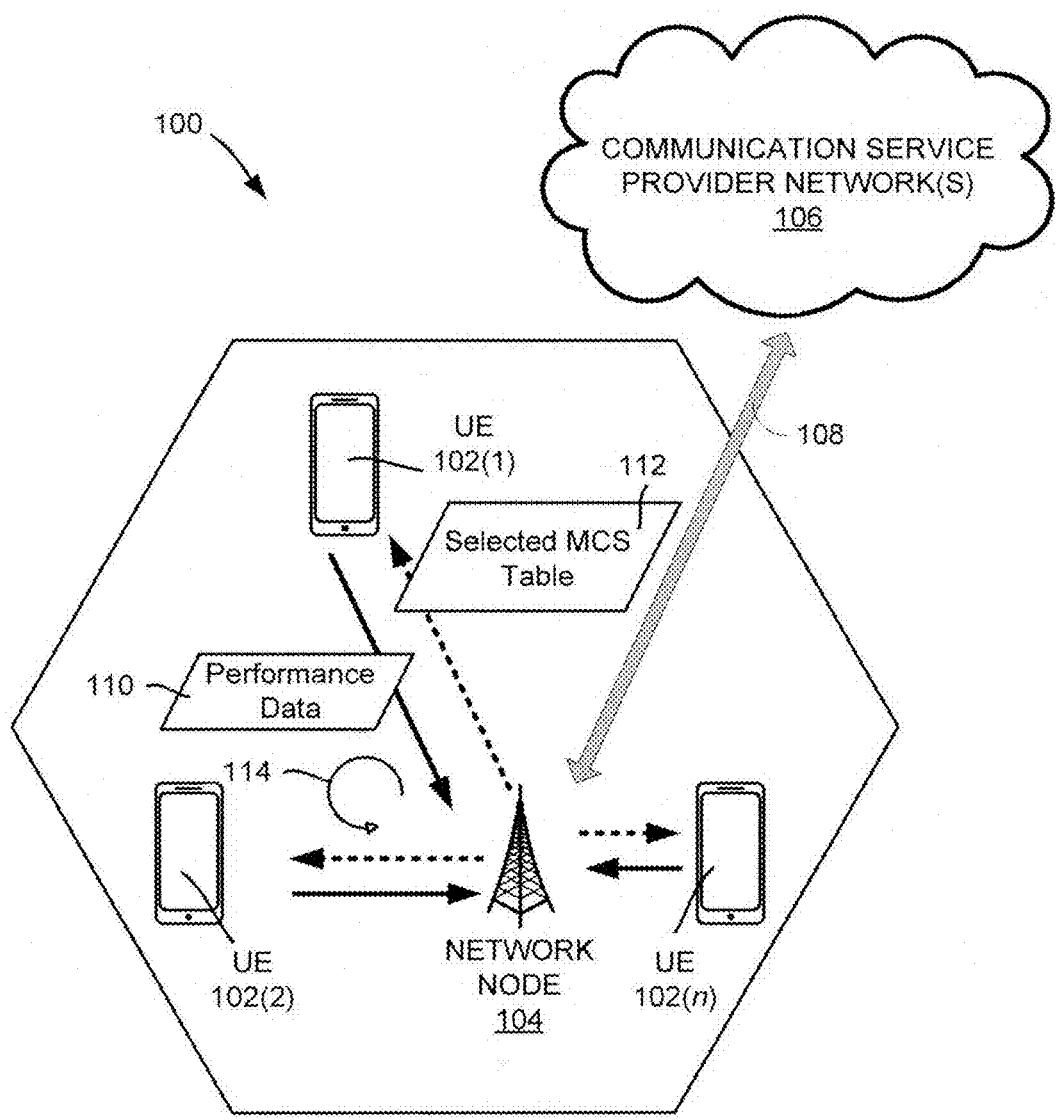
FIG. 1 illustrates an example wireless communication system in which a network node device (e.g., network node) and user equipment (UE) can implement various aspects and implementations of the subject disclosure.

Briefly, one or more aspects of the technology described herein are generally directed towards adaptively selecting and configuring one of the (at least two available) modulation and coding scheme (MCS) tables that a user equipment is capable of using based on performance data corresponding to one or more performance criteria. The user equipment (UL) their uses the configured MCS table unless and until reconfigured. Note that this is in contrast to configuring the MCS reporting table based only on the capability of the user equipment.

Examples of performance data/performance criteria include, but are not limited to, the transmission scheme currently in use, the current user equipment location in the cell, the geometry of the user equipment, the number of base station transmit and/or user equipment receive antennas, and/or the feedback reporting mode. Other examples of performance data / performance criteria include, but are not limited to, the frequency band used in communications, performance of the network node, base station transmission power, deployment scenario of the user equipment, radio environment of the user equipment, user equipment recommendation regarding CQI table, and the type of service being served by the base station. Additional details of these example performance data corresponding to one or more performance criteria are set forth herein. Any of the above performance data/performance criteria can be combined to adaptively make a determination and selection of which modulation and coding scheme table to use.

In general, in one or more implementations, example operations performed in a network node serving a user equipment can comprise using the performance data corresponding to one or more performance criteria to select one of the plurality of pre-defined MCS tables to be used by the user equipment, e.g., when obtaining scheduling parameters for decoding physical downlink shared channel (PDSCH) data and/or for decoding physical uplink shared channel (PUSCH) data. That is, the same performance data/conditions as that of downlink can be applied for MCS selection for PUSCH transmissions. The network node configures the user equipment with the selected MCS table for use by the UE for decoding PDSCH and/or PUSCH transmissions. The technology thus can be implemented in a network node; embodiments can be both standards related and implementation specific.

As will be understood, the technology can provide increased network capacity due to higher order modulation schemes with sufficient granularity. The technology can help ensure that the higher order modulation (e.g. 256 QAM) can be more efficiently used, and can enhance overall user equipment throughput and system throughput.

It should be understood that any of the examples and terms used herein are non-limiting. For instance, the examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. Further, as used in the examples herein, certain performance data and corresponding performance criteria are exemplified; however it is understood that the technology described herein can be used to adaptively switch between MCS tables based on other criteria, including criteria not yet recognized as relevant. Still further, while MCS table 4 and MCS table 5 are used as examples, other tables, including those not yet created, may be adaptively selected for reconfiguring the user equipment, and thus MCS table 4 and MCS table 5 are only two possible examples. Thus, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

FIG. 1 illustrates an example wireless communication system 100 in accordance with various aspects and embodiments of the subject technology. In one or more embodiments, the system 100 can comprise one or more user equipment UEs 102(1)-102(n).

In various embodiments, the system 100 is or comprises a wireless communication network serviced by one or more wireless communication network providers. In example embodiments, a UE 102 can be communicatively coupled to the wireless communication network via a network node 104 (e.g., network device). The network node 104 can communicate with the user equipment (UE) 102, thus providing connectivity between the UE and the wider cellular network.

In example implementations, each UE 102 such as the UE 102(1) is able to send and/or receive communication data via a wireless link to the network node 104. The dashed arrow lines from the network node 104 to the UE 102 represent downlink (DL) communications and the solid arrow lines from the UEs 102 to the network node 104 represents uplink (UL) communications.

The system 100 can further include one or more communication service provider networks 106 that facilitate providing wireless communication services to various user equipment, including UEs 102(1)-102(n), via the network node 104 and/or various additional network nodes (not shown) included in the one or more communication service provider networks 106. The one or more communication service provider networks 106 can include various types of disparate networks, including but not limited to: cellular networks, femto networks, picocell networks, microcell networks, interne protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network nodes and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception.

Note that the solutions outlined equally applies for Multi RAB (radio bearers) on some carriers (that is data plus speech is simultaneously scheduled).Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception.

The wireless communication system 100 can employ various cellular systems, technologies, and modulation schemes to facilitate wireless radio communications between devices (e.g., the UE 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, a user equipment (e.g., 102(1)) is configured to provide performance data 110 (corresponding to one or more performance criteria) to the network node 104, and may receive a selected MCS table 112 as part of user equipment configuration, (or a notification that results in a change to the MCS table in use). To this end, the user equipment can transmit information from which the performance data associated with the user equipment may be computed or otherwise determined, and the network device 104 can adaptively decide whether the user equipment is to change its MCS table. Note that as represented by the looped arrow 114, the network node 104 also may obtain and/or determine performance data based on information the network node 104 possesses, without necessarily needing any performance data from the user equipment.

Figure 2:
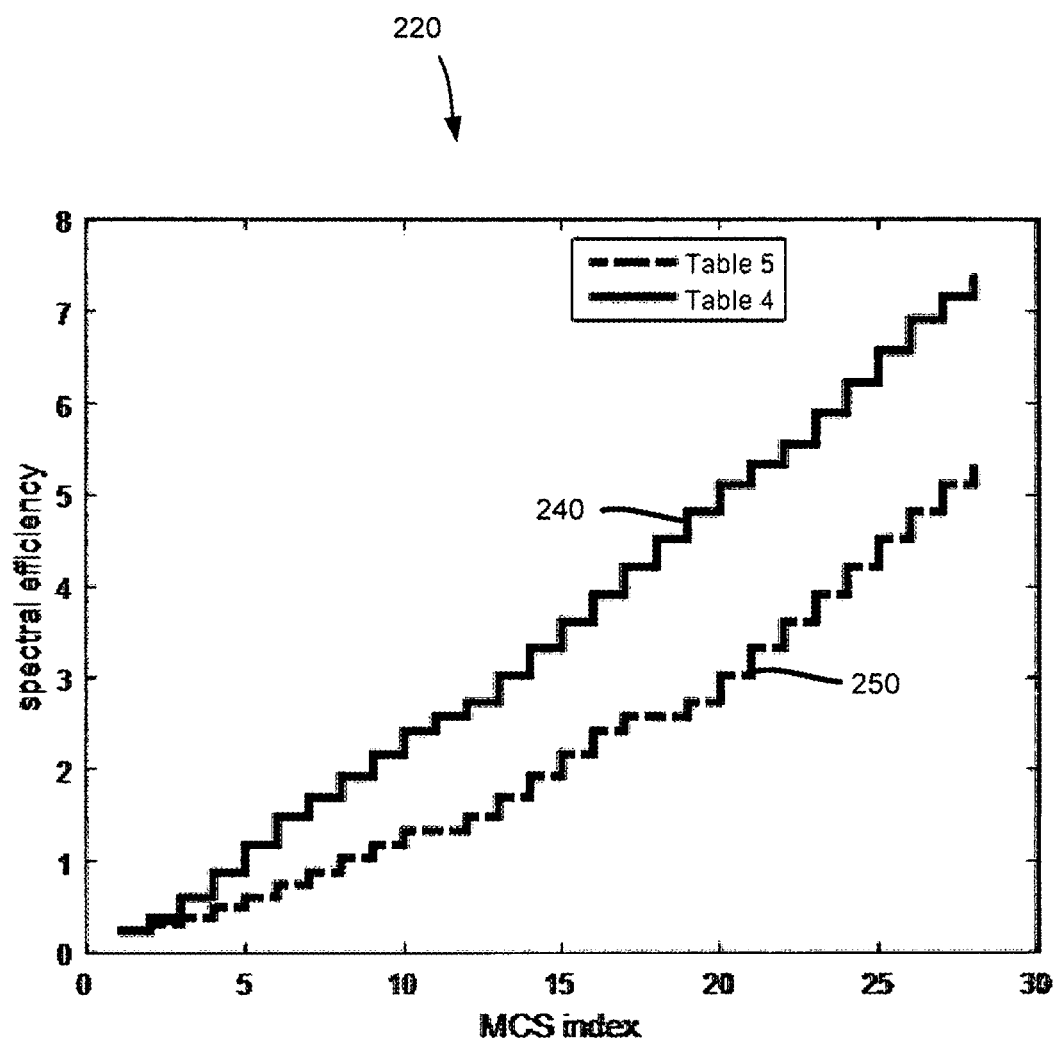
FIG. 2 is a plot showing the spectral efficiency as a function of the MCS index for tables 4 and 5, in accordance with various aspects and implementations of the subject disclosure.

In general, certain aspects of the technology described herein address an observation that configuring the MCS reporting table based only on the capability of the user equipment can be inefficient. For example consider a scenario in which 256-QAM capable user equipment is at the edge of a cell. In such a situation, the user equipment would prefer to have more entries corresponding to QPSK (quadrature phase-shift keying). However, if a network node configures the user equipment based only on the 256-QAM capability, the user equipment has to choose from the entries in the MCS table 5, which are fewer than the number of entries in the MCS table 4. FIG. 2 is a plot 220 showing the spectral efficiency as a function of the MCS index for table 4 (solid line 240) and table 5 (broken line 250). As can be seen, the spectral efficiency loss, defined as the difference between the successive spectral efficiencies in the MCS table, becomes more and predominant at lower MCS indices for MCS table 5 than MCS table 4.

Figure 3:
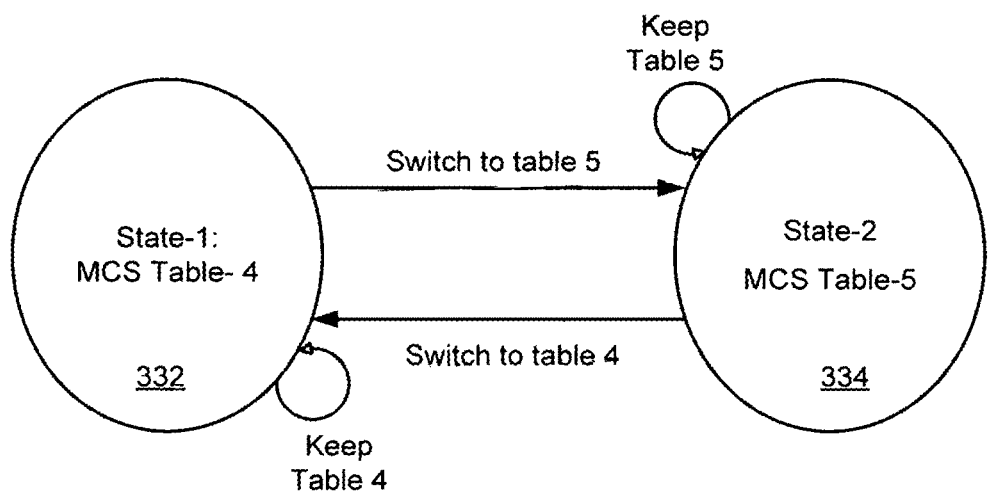
FIG. 3 illustrates an example state diagram that represents transitions for switching from one MCS table to another, or remaining in the same MCS table state, in accordance with various aspects and implementations of the subject disclosure.

FIG. 3 shows a state diagram of an example implementation in which a user equipment is capable of using both MCS Table 4 and MCS Table 5. Note that the technology applies to situations in which a user equipment is capable of using at least two different MCS tables. Note that while some embodiments are described with focus on 256 QAM in the base station (corresponding to MCS Table 5), the embodiments described herein, including the performance criteria and performance data for selecting an MCS table are applicable for any type of higher order (or possibly even lower order) modulation. A higher order modulation is the one with modulation order above a threshold e.g. 256 QAM. Other examples of higher order modulation are 512 QAM, 1024 QAM, 2048 QAM and so on, which may have other MCS tables; (the modulation order may also interchangeably called as modulation format, modulation type, etc.). Still further, there can be an MCS table for ultra-reliable communications, and MCS table(s) other such concepts. Thus, the technology described herein applies to any two or more MCS tables.

As represented in FIG. 3, a network node can adaptively change the state of the MCS table configured in and being used by the user equipment from MCS table 4 (state 332) to MCS table 5 (state 334) or vice versa, or either MCS state 332 or 334 can remain unchanged, depending on one or more conditions, that is, depending on the performance data corresponding to one or more performance criteria. Depending on the performance data, the network node can determine (select) the table that is applicable, and if selected, adaptively inform the user equipment to switch to MCS Table 4 to MCS Table 5, and vice versa. This can be done based on one or more performance data described with reference to FIG. 4.

Figure 4:
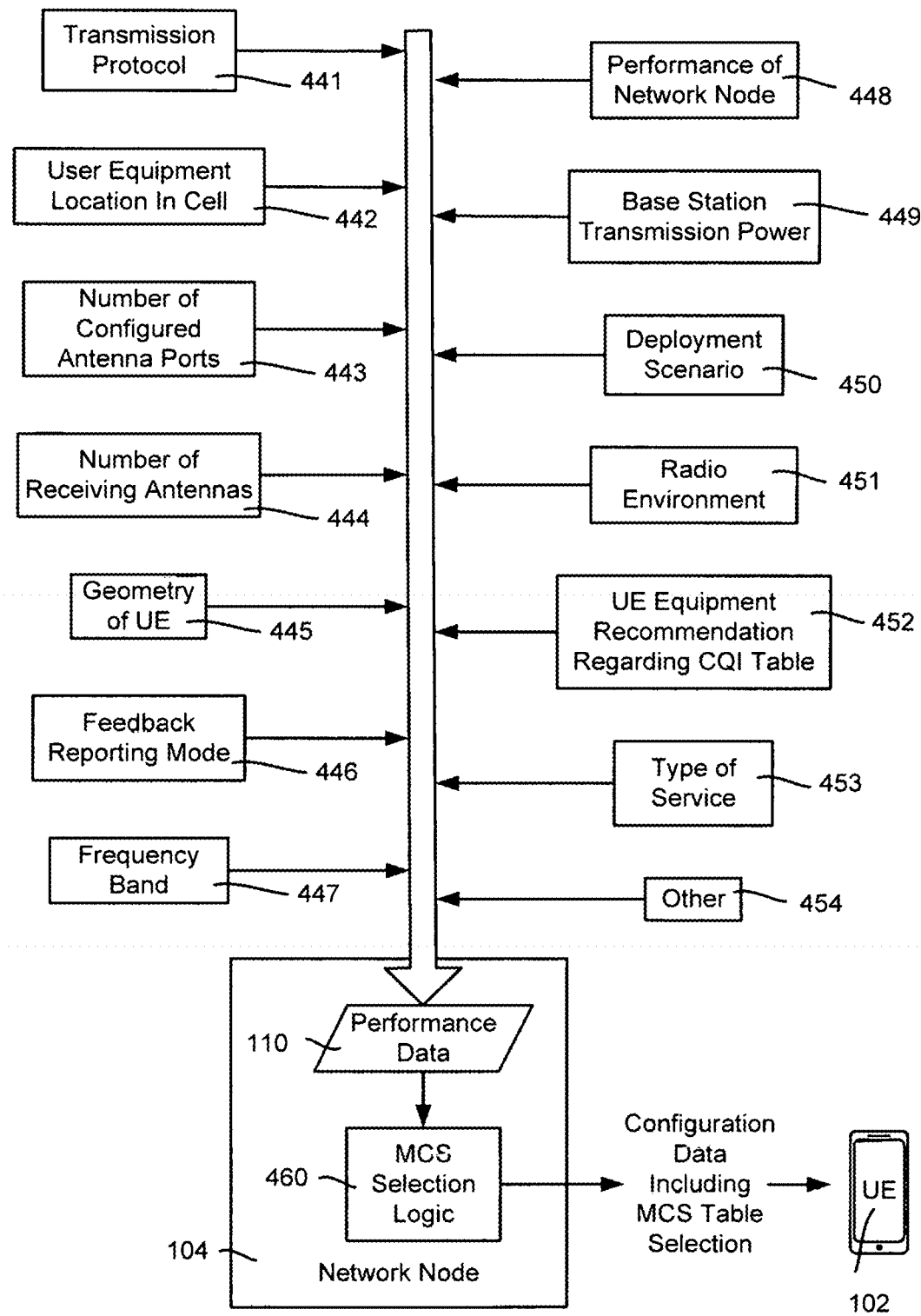
FIG. 4 shows example performance data corresponding to performance criteria that can be used in selecting an MCS table for configuring a user equipment, in accordance with various aspects and implementations of the subject disclosure.

FIG. 4 represents non-limiting examples of possible performance data 110, separately labeled as 441-454. As is understood, some of this information can be obtained (and/or determined) from data from the user equipment, while other information can be known to the network node. In general, MCS selection logic 460 uses one or more of these performance data 441-454 (performance criteria, or conditions) to determine whether to adaptively select and configure a user equipment 102 with which MCS table of a set or group of available MCS tables, assuming the user equipment is capable of switching to use that MCS table; (a switch is not made unless the user equipment can use another table).

Figure 5:
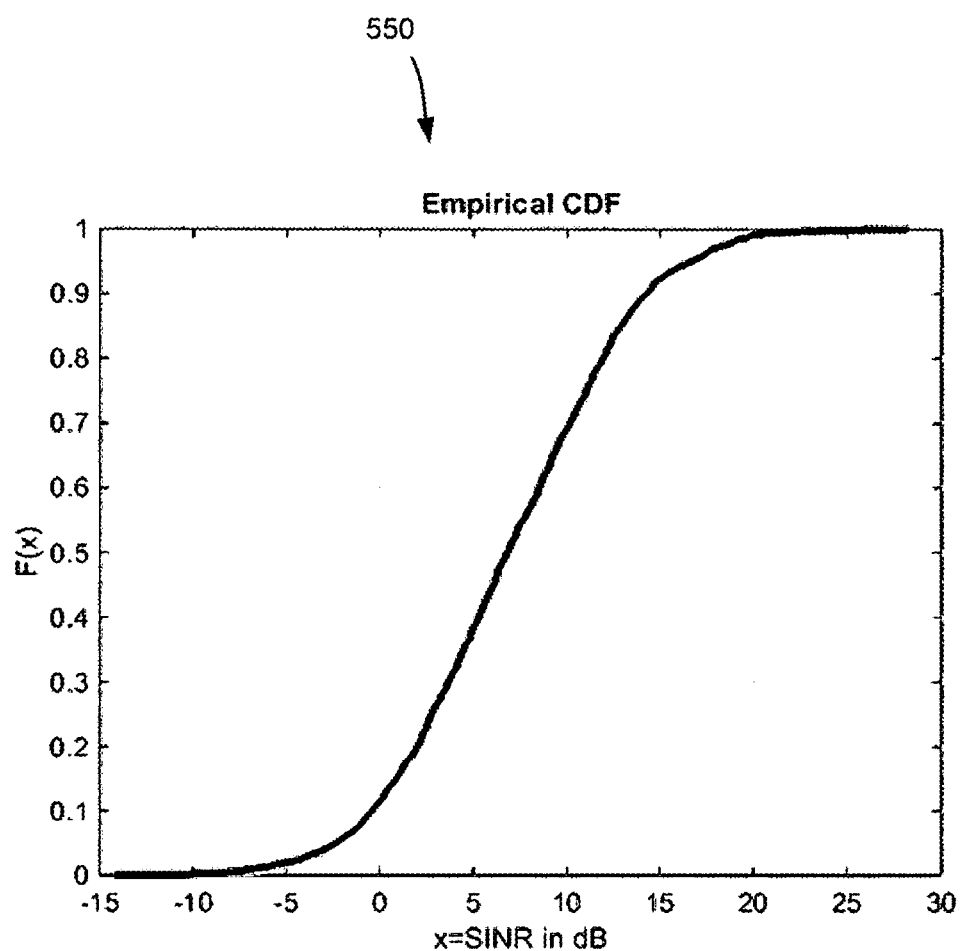
FIG. 5 is an example plot showing the distribution of SINR (signal-to-interference-plus-noise ratio) with transmit diversity, in accordance with various aspects and implementations of the subject disclosure.

Block 441 represents performance data corresponding to a current configured transmission mode for a user equipment. More particularly, in new radio, the user equipment can use either a closed loop transmission scheme or semi-open loop transmission scheme (also referred to as transmit diversity), which is transparent to the user equipment. In general, the user equipment is configured or PDSCH is transmitted using the closed loop technique for high data rate applications, while the transmit diversity scheme is applied for PDSCH when the user equipment is moving with high speed, and/or mainly for low rate applications. In general with the transmit diversity scheme, the probability of achieving a high SNR (signal to noise ratio) greater than 20 dB is almost negligible in a wide area base station (macro) network. In these cases, the network can determine that user equipment is to not use an MCS table (index) corresponding to 256-QAM, and thus can recommend or indicate to the user equipment to switch to MCS Table 4 (or possibly another table other than MCS Table 5). As an example, FIG. 5 shows the instantaneous SINR cdf (cumulative distribution function) plot 550 for transmit diversity, where it is observed that that no or almost no UEs achieve a SINR greater than 20 dB. Again, PUSCH can use the same or similar logic for MCS table selection.

Returning to FIG. 4, another possible criterion for determining whether to use MCS table 4 or table 5 (or possibly another table) is to identify the location of the user equipment in the cell, as represented by block 442. For example when the user equipment is nearer to the network node (cell center), the user equipment can be configured to use MCS Table 5. This is because at the cell center the user equipment generally reports a higher modulation. Similarly, when the user equipment is at the cell edge, the network node can instruct the user equipment to report using MCS Table 4.

Note that there are several techniques to identify the user equipment location from network node. For example the user equipment location in the cell can be determined using one or more positioning methods and/or signals measurements used for radio operations. Non-limiting examples of positioning techniques and corresponding measurements are GNSS (e.g. GPS) measurements, enhanced cell ID (E-CID) measurements such as user equipment or BS Rx-Tx time difference measurements, timing advance (TA), angle of arrival (AoA), OTDOA RSTD, etc. Examples of signal measurements used for radio operations are the reported CQIs, measurements used for the mobility such as RSRP and RSRQ measurement reports, etc. The size of the neighbor cell list (NCL) need for the user equipment can also be used as an indication as to whether the user equipment is at the cell center or not. For example if serving cell RSRP is below a threshold (e.g. −100 dBm) then the network node may assume that the user equipment is in the cell border.

Another possible performance criterion for determining the MCS table is based on the performance data of the number of configured transmit antenna ports at the network node, represented by performance data block 443. More particularly, the network node can evaluate the number of transmit antenna ports (transmission side) for the specific user equipment. For example the probability of achieving SINR greater than 20 dB is high when the user equipment is configured with at least four transmit antenna ports. This is because of the additional transmit diversity or beamforming provided by the antenna elements. Therefore the network node may choose MCS table 5 when configured with four antenna ports and MCS table 4 when it is configured with less than four antennas ports (e.g. two antenna ports) to serve the user equipment. More generally the network node chooses MCS table 5 when it is configured with number of antenna ports larger than or equal to a Tx antenna threshold (e.g. four antenna ports) and otherwise chooses MCS table 4 to serve the user equipment. Note that more than one threshold may be used if more tables are available, e.g., two thresholds can be used for three MCS tables, and so on. Still further, the threshold can change based on other performance data, e.g., use one threshold if the user equipment is near the cell center, and a different threshold if the user equipment is near the cell edge.

Figure 6:
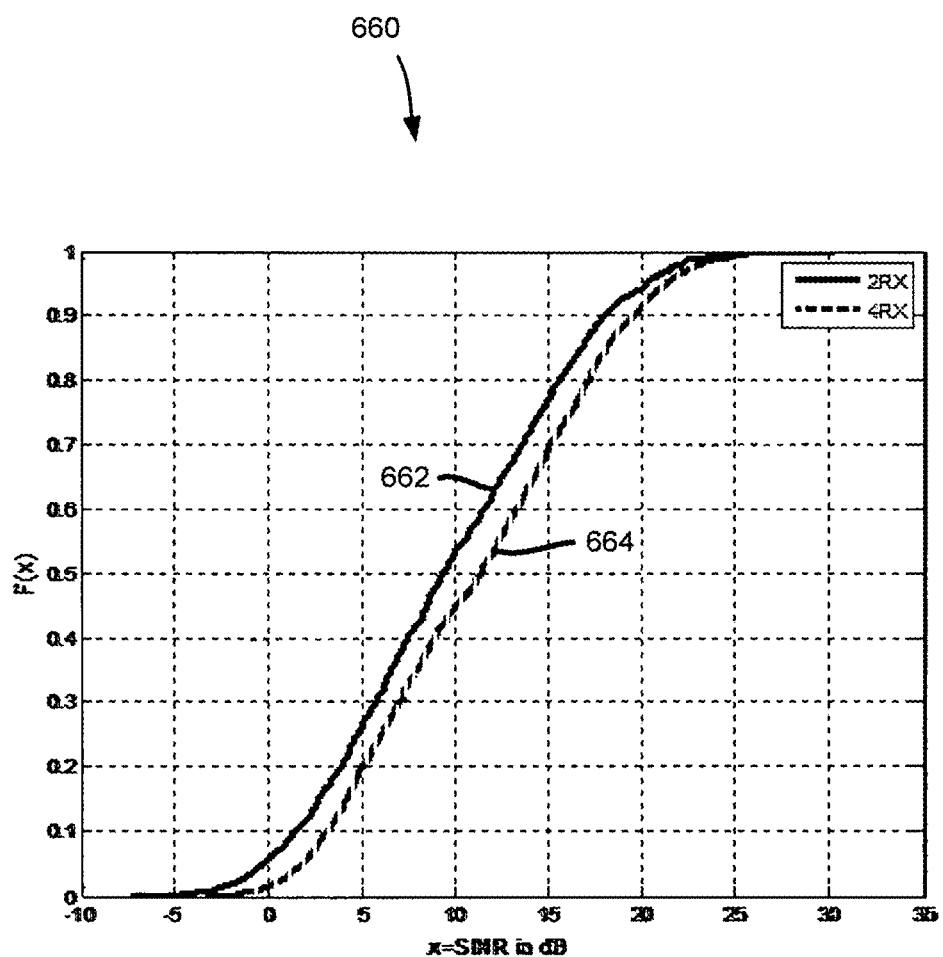
FIG. 6 is an example plot showing the distribution of SINR with different receiver antennas at the user equipment, in accordance with various aspects and implementations of the subject disclosure.

Another possible criterion for determining the MCS table, represented by the performance data block 444, is the number of receiver antennas for the specific user equipment. FIG. 6 shows the cdf plot 660 for the instantaneous SINR when the user equipment is configured with two antenna ports (solid line 662) and four antenna ports (broken line 664). It can be observed that the probability of achieving SINR greater than 20 dB is high when the user equipment is equipped with four receiving antennas. This is because of the additional receiver diversity performance gain achieved by the antenna elements. Therefore the network node can decide to choose MCS table 5 when the user equipment is equipped with at least four receiving antennas and MCS table 4 when it is equipped with less than four receiving antennas (e.g. two antennas). In another aspect of this criterion the network node, chooses MCS table 5 provided the user equipment capable of four or more antennas actually uses at least four receiving antennas and MCS table 4 when actually uses less than four receiving antennas. More generally the network node chooses MCS table 5 when the user equipment is equipped with a number of receiving antennas larger than or equal to a receive antenna threshold, such as four. In another aspect of this criterion more generally the network node chooses MCS table 5 when the user equipment actually uses the number of receiving antennas larger than or equal to the receive antenna threshold (such as four).

The network node may determine whether the user equipment is equipped with or is actually using the number of antennas larger than or equal to the receive antenna threshold based on one or more of the following data, including, but not limited to, an indication received from the user equipment, pre-defined specification of the user equipment and autonomous determination by the network node e.g. based on user equipment measurement reports, statistics and historical data. Note that there are many techniques to identify the number of receiver antennas, such as by manufacture declaration or by another known technique at the network node. Note that more than one threshold may be used if more tables are available, e.g., two thresholds can be used for three MCS tables, and so on. Still further, the threshold can change based on other performance data, e.g., use one threshold if the user equipment is near the cell center, and a different threshold if the user equipment is near the cell edge.

In FIG. 4, as represented by the performance data block 445, yet another possible criterion for determining the MCS table is the geometry of the user equipment. At low geometries (e.g. lower SINR), the user equipment prefers to use a lower modulation scheme, therefore the network node selects MCS Table 4 for use. At high geometries (e.g. higher SINR), the user equipment prefers to use a higher modulation scheme as a higher data rate can be achieved; therefore the network node can select MCS Table 5 under higher user equipment geometry. As is understood, with any selection, the network node may select an MCS table other than Table 4 and Table 5 if the user equipment is capable of using such a table.

Figure 7:
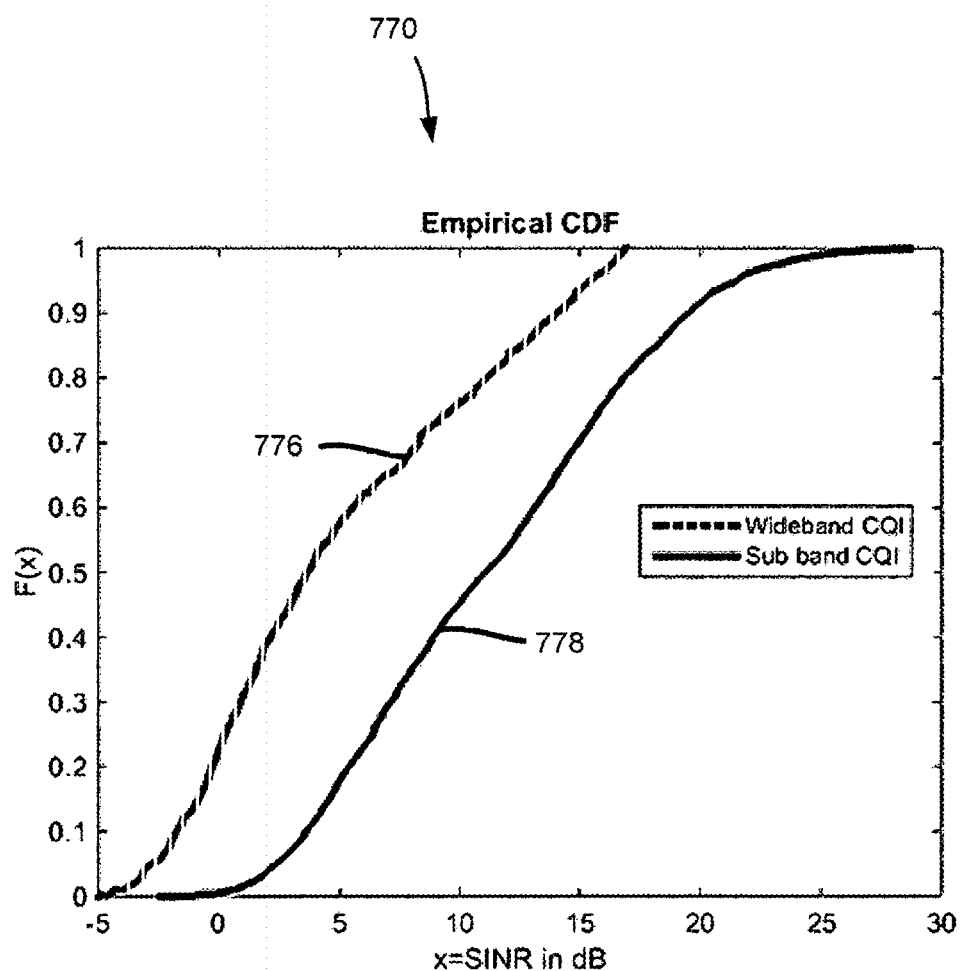
FIG. 7 is an example plot showing the distribution of SINR wideband versus sub-band channel quality information, in accordance with various aspects and implementations of the subject disclosure

Another possible criterion for determining the MCS table, represented by the performance data block 446, is the feedback reporting mode. In New Radio, the network node can configure the user equipment to report wideband CQI and/or sub-band CQI. Typically sub-band CQI for some of the sub-bands is better than the wideband CQI. FIG. 7 shows the SINR distribution plot 770 for the wideband CQI (broken line 776) and sub-band CQI (solid line 778). It can be observed that with wideband CQI a SINR greater than 20 dB is not really achievable.

Therefore, in one or more implementations that select between MCS table 4 and MCS table 5, if the user equipment is configured with wideband CQI reporting only, then MCS table 4 is used; if the user equipment is configured with sub band CQI reporting then MCS table 5 is used. If the user equipment is configured with wideband and sub-band CQI reporting modes then in one example, only MCS table 4 can be used for both reporting modes. In one example if the user equipment is configured with wideband and sub-band CQI reporting modes then MCS table 4 and MCS table 5 can be used for the wideband CQI and sub-band CQI reporting modes, respectively.

Another possible criterion for determining the MCS table, represented by the performance data block 447, is the frequency band of operation. More particularly, performance of the RF front-end, and also the radio link, depends on the carrier frequency. For example, at higher frequencies components such as oscillators, mixers, RF filters, duplexers, diplexers and power amplifiers can exhibit more impairments than in the lower frequencies. Such impairments or losses leads to degradation in SINR achieved at the user equipment. Thus, the network node may determine the MCS table based on the frequency band or the carrier frequency used for the downlink (and/or uplink) transmission. For example when user equipment is operating at lower frequencies (e.g. frequency bands below 1 GHz) then the network node may use MCS table 5; when the user equipment is operating at higher frequencies (e.g. frequency bands above 1 GHz), then the network node may use MCS table 4. Note that a threshold other than 1 GHz may be used, and that more than one threshold may be used if more tables are available, e.g., two thresholds can be used for three tables, and so on. Still further, the threshold can change based on other performance data, e.g., use one frequency threshold if the user equipment is near the cell center, and a different threshold if the user equipment is near the cell edge.

Still another possible criterion for determining the MCS table, represented by the performance data block 448, is a performance metric representing the RF transmitter and/or receiver. More particularly, the advantage of using 256 QAM over lower modulation schemes can depend on the performance of the transmitter and receiver nodes. According to one technique, the network node can determine which MCS table to be used based on the RF frontend of the network node and/or the user equipment (RF architecture or structure). Examples of such implementations are low cost small radio nodes or low cost user equipments (such as machine type communication MTC user equipments, user equipment category 0), where it is likely that higher order modulation does not provide any substantial performance gain due to higher RF impairments. The network node may determine the user equipment with reduced performance based on one or more of indication or capability information of the user equipment received from the user equipment, pre-defined specification of the user equipment and autonomous determination by the network node, e.g. based on statistics or historical data of the user equipment measurement reports, etc. For example a user equipment with low cost RF architecture may be configured with MCS table 4.

Another possible criterion for determining the MCS table, represented by the performance data block 449, is the base station transmission power. The base station total maximum transmit power, even in a wide area base station, may vary from one base station implementation to another. For example, base station total maximum transmit power may depend on factors such as the coverage area to be served by the base station, number of carriers supported by the base station, number of transmit antennas in the base station, etc. Furthermore the base station maximum transmit power available for each user equipment may further depend on factors such as cell load (e.g. number of user equipments in the cell served by the user equipment, etc.), frequency band used by the user equipment etc.

According to this criterion the network node may select the MCS table for a particular user equipment depending upon the base station total maximum transmit power (Ptotal, max) and/or the base station maximum transmit power available (Pmax,UE) for this particular user equipment.

For example if the Ptotal, max is above or equal to a total maximum power threshold (e.g. 43 dBm) and/or Pmax,UE is above or equal to maximum available power threshold (e.g. 24 dBm), then the network node may decide to use MCS table 5 for this user equipment; otherwise the network node may decide to use MCS table 4 for this user equipment.

In yet another example represented by performance data block 450, the network node may select the MCS table for a particular user equipment depending upon the deployment scenario in which the user equipment is operating. Examples of parameters which characterize deployment scenario include, but are not limited to, cell size of the cell served by the base station (e.g. cell range, cell radius, etc.), inter-site distance between base stations, homogeneous or heterogeneous network, etc.

For example if base station is wide area and the cell range is short, then the network node may expect the user equipment close to the user equipment to experience higher SINR. In this case the network node may choose the MCS table 5 for such user equipment.

The radio environment, represented by performance data block 451 in FIG. 4, is another possible example for which the network node may select the MCS table for a particular user equipment, that is, depending upon the radio environment in which the user equipment is operating. Examples of parameters which characterize radio environment include, but are not limited to, user equipment speed (e.g. user equipment Doppler frequency), multipath delay profile or delay spread, channel delay spread, radio channel coherence bandwidth, shadow fading, and so on. The base station can determine the radio environment in which the user equipment is operating or is expected to operate by measuring one or more of user equipment Doppler frequency, channel coherence bandwidth, channel coherence time, etc.

For example if the radio environment is determined to be highly dispersive (e.g. delay spread larger than 1 μs) and/or user equipment speed is above a threshold (e.g. greater than 5 km/hour) then the network node may choose the MCS table 5 for such user equipment; otherwise it may use MCS table 4 for this user equipment.

According to yet another example of possible criteria for switching the MCS table, the network node may also take into account the recommendation about which MCS table to use from the user equipment, that is, the user equipment recommendation regarding MCS table as represented by performance data block 452. For example, the user equipment, based on one or more measurements (e.g. SINR, BLER (block error rate), CQI, RSRQ (reference signal received quality), etc.) may determine the most appropriate MCS table to be used for decoding the PDSCH and/or PUSCH. The most appropriate MCS herein refers to, for example, the one which likely leads to the least number of retransmission of data blocks and/or lowest BLER and/or maximum user equipment throughput under the given radio conditions.

In one example the user equipment may be configured to send the recommendation periodically, such as once every radio frame. In another example the user equipment may be configured to send the recommendation along with each CQI report. In yet another example the user equipment may be configured to send the recommendation only when the currently used MCS table is to be changed.

In one example the network node may select the MCS table based on any user equipment recommendation. In yet another example the network node may select the user equipment recommended MCS table only if the user equipment has repeatedly (e.g. N number of times in a time period) recommended the network node to use the same MCS table. As an example N=4 consecutive recommendations. The network node may decide to not accept the user equipment recommendation regardless, such as if overridden by other performance data.

In yet another example represented by performance data block 453, the network node may decide to switch the MCS table based on the type of service that the base station is serving, e.g., with respect to a user equipment. More particularly, in New Radio, a base station can serve different services such as eMBB (enhanced mobile broadband), URLLC (Ultra Reliable low latency communication), and/or mMTC (Massive Machine Type of Communication), where the requirements for MCS/CQI selection are different for each application. For example, for eMBB data applications it is preferable to use an MCS table with higher peak rate, while for URLLC applications, it is preferable to use an MCS table with more reliability (e.g., the MCS table with the majority of QPSK/16 QAM entries).

Although the above exemplify some performance data that may be used, it is understood that these are only non-limiting examples. Other performance criteria/performance state data may be used, as represented by block 454. Note that "performance" can refer to actual performance or anticipated performance, and thus other performance-related data 454 may include concepts such as time of day, day of week, anticipated load, and so forth. For example, if statistical and/or historical information predicts that that a user equipment likely can benefit more from one MCS table versus another, then such information can be used, at least as a factor, in selecting an MCS table for that user equipment.

Still further, it is understood that any combination of criteria/performance data can be used. As mentioned above, a combination of performance data can change thresholds; however, still further combinations can be used to make a decision such as with Boolean logic rules, such as "use MCS table X if certain perfoiiiianee data indicates performance data conditions [(A AND B) or C] are met, else use MCS table Y" and the like.

Figure 8:
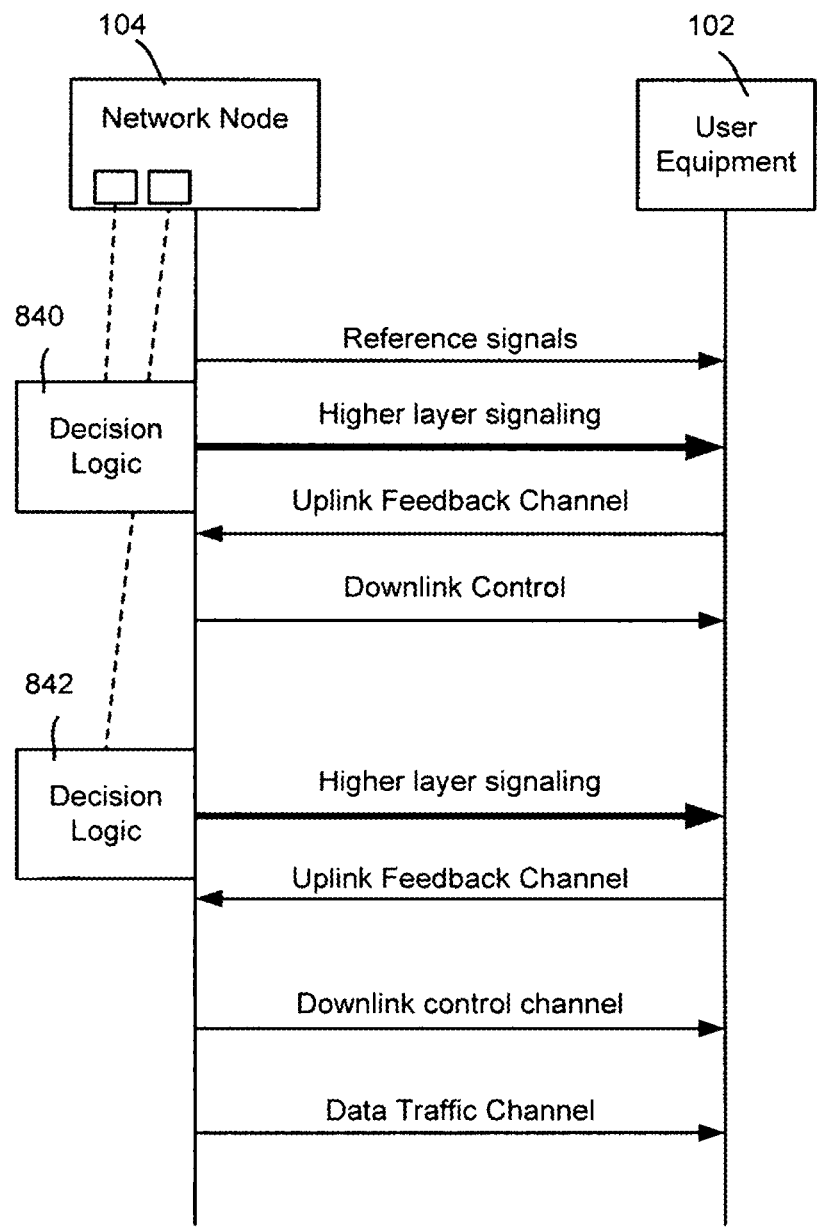
FIG. 8 is an example message sequence diagram with higher layer signaling about a channel quality information table, in accordance with various aspeels and implementations of the subject disclosure.

Turning to example configuration of the user equipment, FIG. 8 shows an example of message sequence chart with higher layer signaling about a channel quality information table. As can be seen, initially, the network node (decision logic 840) configures the user equipment with one type of MCS table using a message (e.g. higher layer signaling such as RRC or MAC). The network node can periodically check the selection criteria for the MCS table, and if it is determined (decision logic 842) based on the performance criteria/data that the last configured MCS table is to be changed, then the network node sends a message (e.g. using higher order signaling such as RRC or MAC) to the user equipment to use another MCS table. Two or more MCS tables can be pre-defined. Therefore, when the current MCS table used by the user equipment is determined to be changed then the network node may typically send an identifier of the new table to be used by the user equipment.

Figure 9:
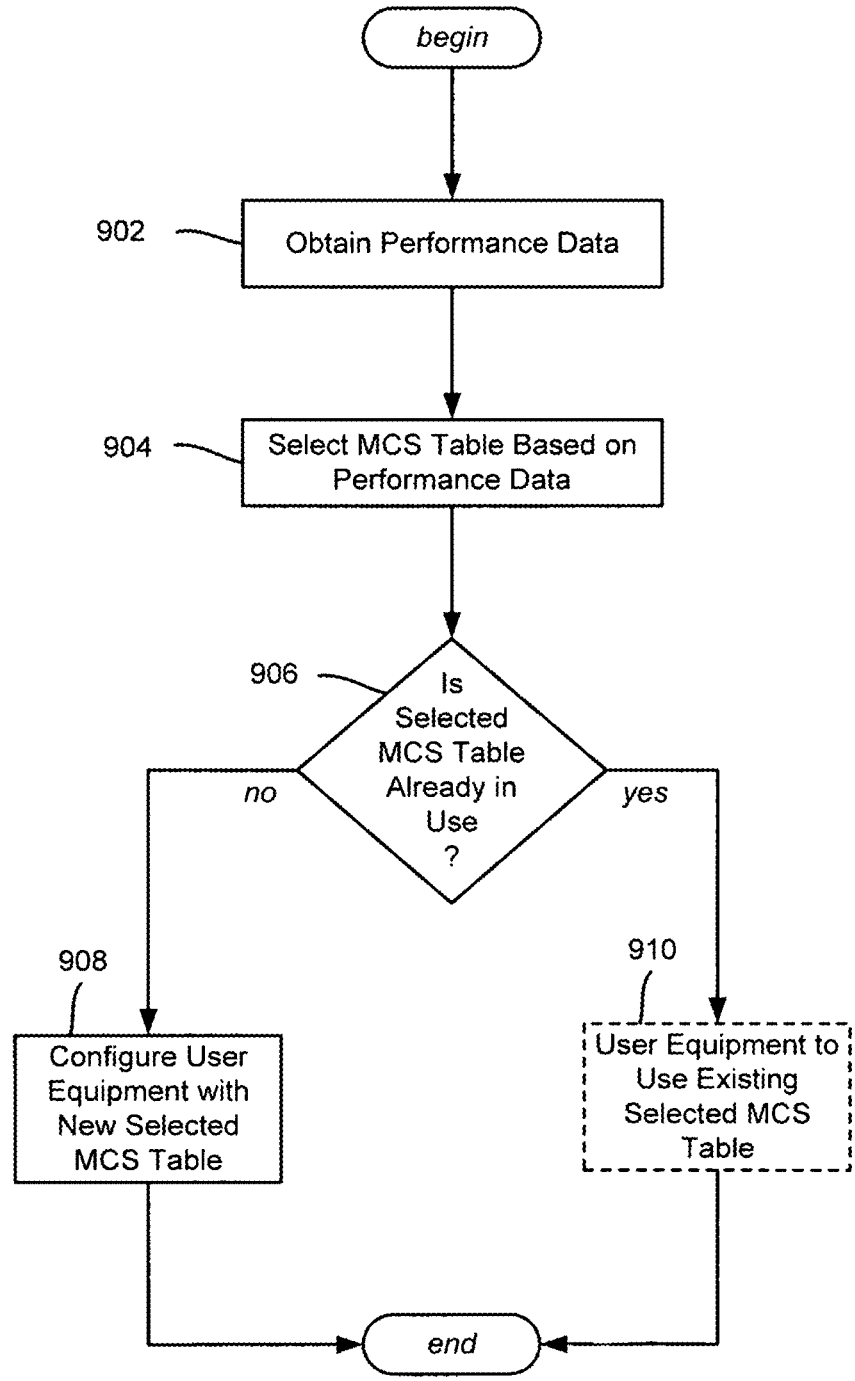
FIG. 9 is a flow diagram representing example operations for adaptively selecting and configuring user equipment to use an MCS table based on performance data, in accordance with various aspects and implementations of the subject disclosure.

FIG. 9 shows example change logic in the form of operations, beginning at operation 902 where performance data is obtained. Based on the performance data, operation 904 selects an MCS table to use. If at operation 906 the MCS table is different from the one already in use, operation 908 configures (e.g., sends an indication) to the user equipment to use the new selected MCS table. Note that operation 910 represents no change to the MCS table; operation 910 is shown as a dashed block, in that it is feasible in some implementations that a user equipment can receive an indication to reconfigure some other parameters or the like, and expects some MCS table identifier to be provided in the message, whereby the network node provides the same MCS table identifier as that already in use.

Figure 10:
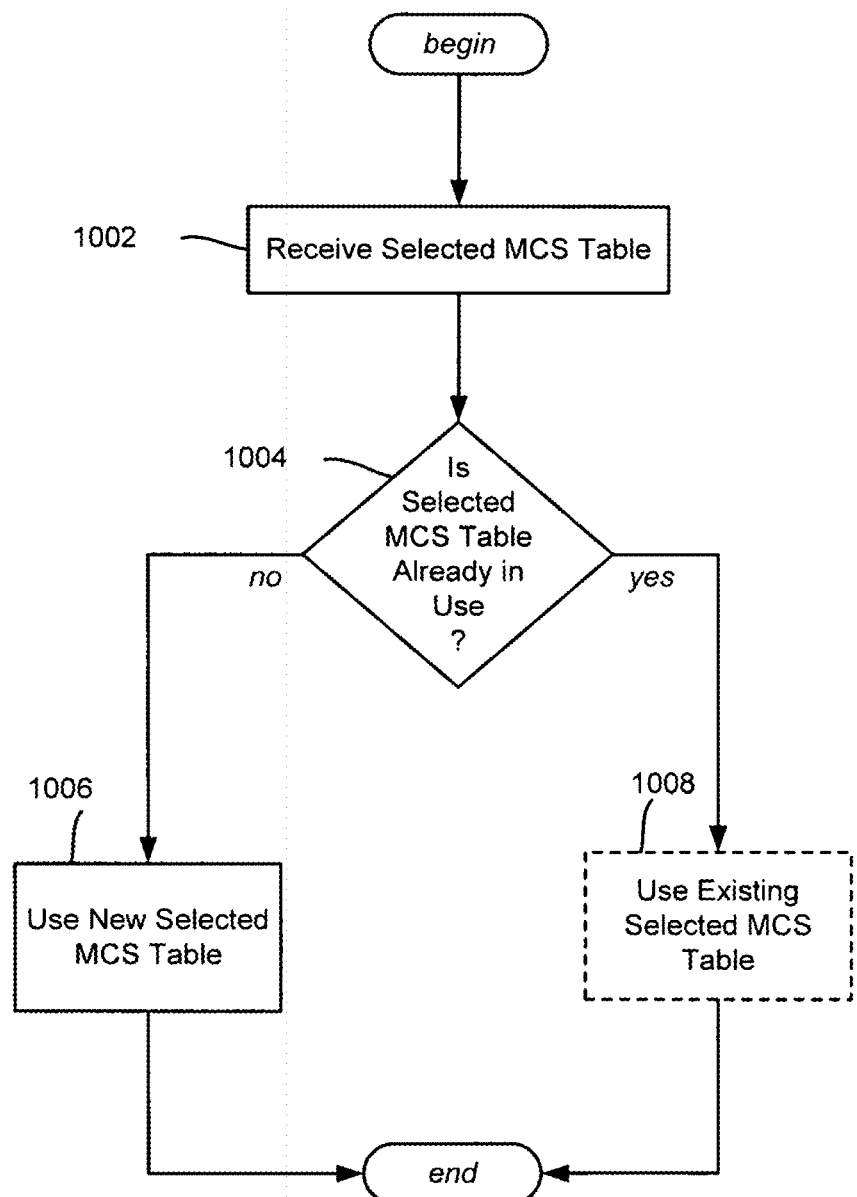
FIG. 10 is a flow diagram representing example operations at a user equipment for using a network node-specified MCS table, in accordance with various aspects and implementations of the subject disclosure.

FIG. 10 shows example user equipment logic in the form of operations, beginning at operation 1002 where the configuration indication regarding the MCS table to use is received. If at operation 1004 the MCS table is different from the one already in use, operation 1006 switches the user equipment to use the new selected MCS table. Note that operation 1008 represents no change to the MCS table; operation 1008 is shown as a dashed block, in that it is feasible in some implementations that a user equipment can receive an indication to use the MCS table already in use, and can basically or effectively ignore such an indication.

Figure 11:
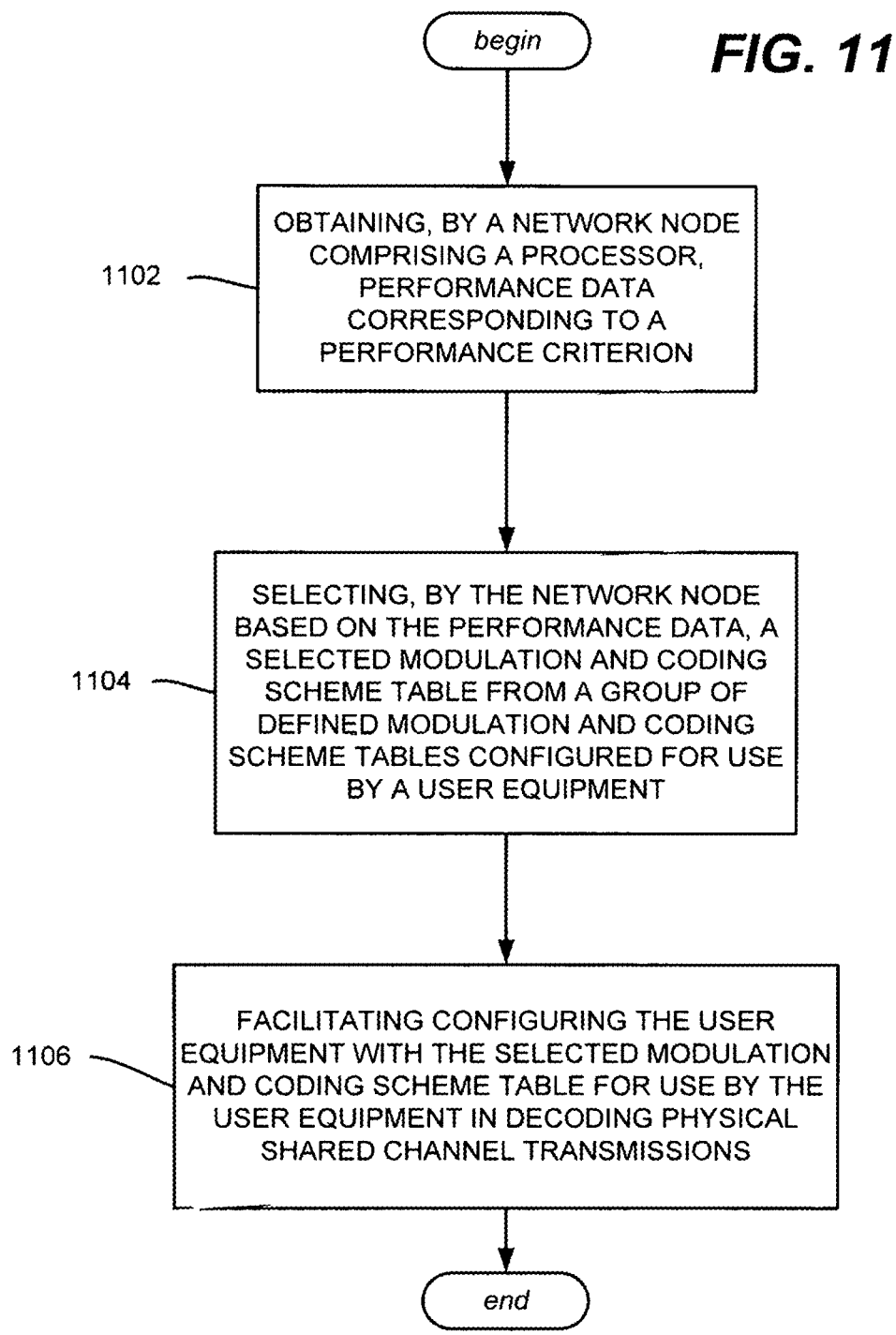
FIG. 11 illustrates an example flow diagram of network device operations for taking action to change the MCS table, based on a performance data, in accordance with various aspects and implementations of the subject disclosure.

One or more aspects, generally represented in FIG. 11 as example operations or acts, are generally directed towards obtaining, by a network node comprising a processor, performance data corresponding to a performance criterion (operation 1102). Operation 1104 represents selecting, by the network node based on the performance data, a selected modulation and coding scheme table from a group of defined modulation and coding scheme tables configured for use by a user equipment. Operation 1106 represents facilitating configuring the user equipment with the selected modulation and coding scheme table for use by the user equipment in decoding physical (downlink and/or uplink) shared channel transmissions.

Selecting can comprise selecting the selected modulation and coding scheme table based on a transmission scheme from among a group of available transmission schemes comprising a closed loop transmission scheme and a semi-open loop transmission scheme.

Obtaining, by the network node, the performance data can comprise obtaining a location of the user equipment in a cell, and selecting can comprise selecting the selected modulation and coding scheme table based on the location of the user equipment in the cell.

The selecting can comprise selecting the selected modulation and coding scheme table based on at least one of a first number of configured transmitting antenna ports that serve the user equipment, or a second number of receiving antennas at the user equipment. The selecting can comprise selecting the selected modulation and coding scheme table based on a geometry of the user equipment. The selecting can comprise selecting the selected modulation and coding scheme table based on a feedback reporting mode from a group of available feedback reporting modes, wherein the group of available feedback reporting modes comprise a wideband channel quality indicator reporting mode and a sub-band channel quality indicator reporting mode.

The selecting can comprise selecting the selected modulation and coding scheme table based on a frequency band of downlink (and/or uplink) transmission. The selecting can comprise selecting comprises selecting the selected modulation and coding scheme table based on at least one of a performance of the network node, or a base station transmission power. The selecting can comprise selecting the selected modulation and coding scheme table based on at least one of a deployment scenario in which the user equipment is operating, or a radio environment of the user equipment.

The selecting can comprise selecting the selected modulation and coding scheme table based on a user equipment recommendation regarding a channel quality indicator table. The selecting can comprise selecting the selected modulation and coding scheme table based on a type of service served by the network node.

The selecting can comprise selecting the selected modulation and coding scheme table based on at least two of: a transmission protocol, a user equipment location in a cell, a first number of configured antenna ports, a second number of receiving antennas at the user equipment, a geometry of the user equipment, a feedback reporting mode, a frequency band of downlink and/or uplink transmission, a performance of the network node, a base station transmission power, a deployment scenario, a radio environment of the user equipment, a user equipment recommendation regarding a channel quality indicator table, or a type of service served by the network node.

Configuring the user equipment with the selected modulation and coding scheme table can occur as part of providing scheduling parameters from the network node to the user equipment for decoding the physical downlink and/or uplink shared channel transmissions.

Figure 12:
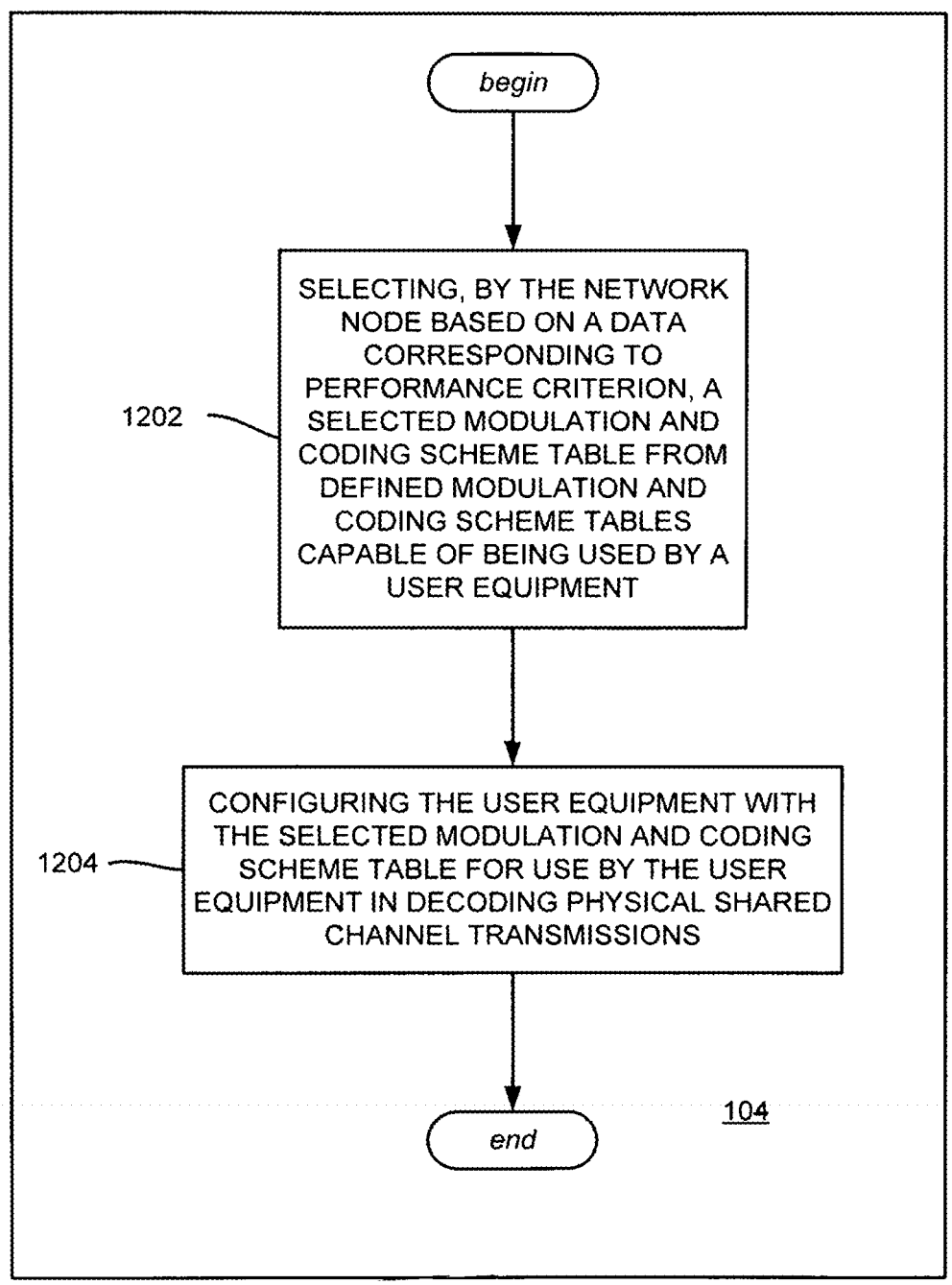
FIG. 12 illustrates a block diagram of a network device's example operations, comprising operations for taking action to change the MCS table, based on a performance data, in accordance with various aspects and implementations of the subject disclosure.

An example embodiment of a network device 104 comprising a processor and a memory that stores executable instructions that, when executed by the processor, facilitate performance of operations, is represented in FIG. 12. Example operations can include selecting, by the network node based on performance data corresponding to performance criterion, a selected modulation and coding scheme table from defined modulation and coding scheme tables capable of being used by a user equipment (operation 1202). Another operation can comprise configuring the user equipment with the selected modulation and coding scheme table for use by the user equipment in decoding physical (downlink and/or uplink) shared channel transmissions (operation 1204).

The defined modulation and coding scheme tables capable of being used by the user equipment can comprise modulation and coding scheme table 4 and modulation and coding scheme table 5. The selecting can comprise selecting the selected modulation and coding scheme table based on a user equipment location in a cell. The selecting based on the performance data can comprise selecting the selected modulation and coding scheme table based on at least one of: a transmission scheme, a number of configured antenna ports, or a number of receiving antennas at the user equipment.

Figure 13:
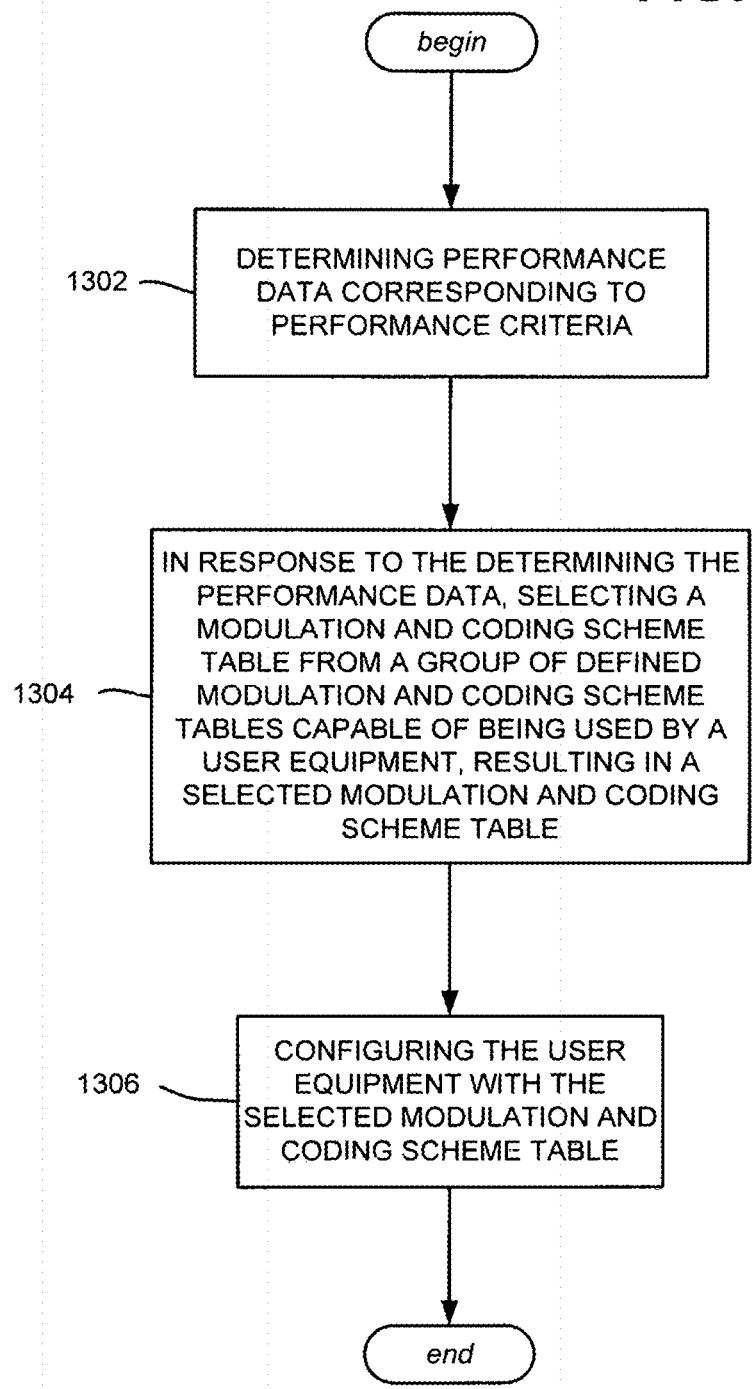
FIG. 13 illustrates an example flow diagram of network node operations for changing the MCS table, based on a performance data, in accordance with various aspects and implementations of the subject disclosure, in accordance with various aspects and implementations of the subject disclosure.

FIG. 13 represents operations, such as in the form of a machine-readable storage medium, comprising executable instructions that, when executed by a processor of a user equipment, facilitate performance of operations. Operation 1302 represents determining performance data corresponding to performance criteria. Operation 1304 represents, in response to the determining the performance data, selecting a modulation and coding scheme table from a group of defined modulation and coding scheme tables capable of being used by a user equipment, resulting in a selected modulation and coding scheme table. Operation 1306 represents configuring the user equipment with the selected modulation and coding scheme table.

Selecting the modulation and coding scheme table can comprise selecting the modulation and coding scheme table based on a geometry of the user equipment. Selecting the modulation and coding scheme table can comprise selecting the modulation and coding scheme table based on at least one of: a feedback reporting mode, a frequency band of downlink and/or uplink transmission, a performance of the radio network node, base station transmission power, a deployment scenario of the user equipment, a radio environment of the user equipment, or a user equipment recommendation regarding a channel quality indicator table.

Figure 14:
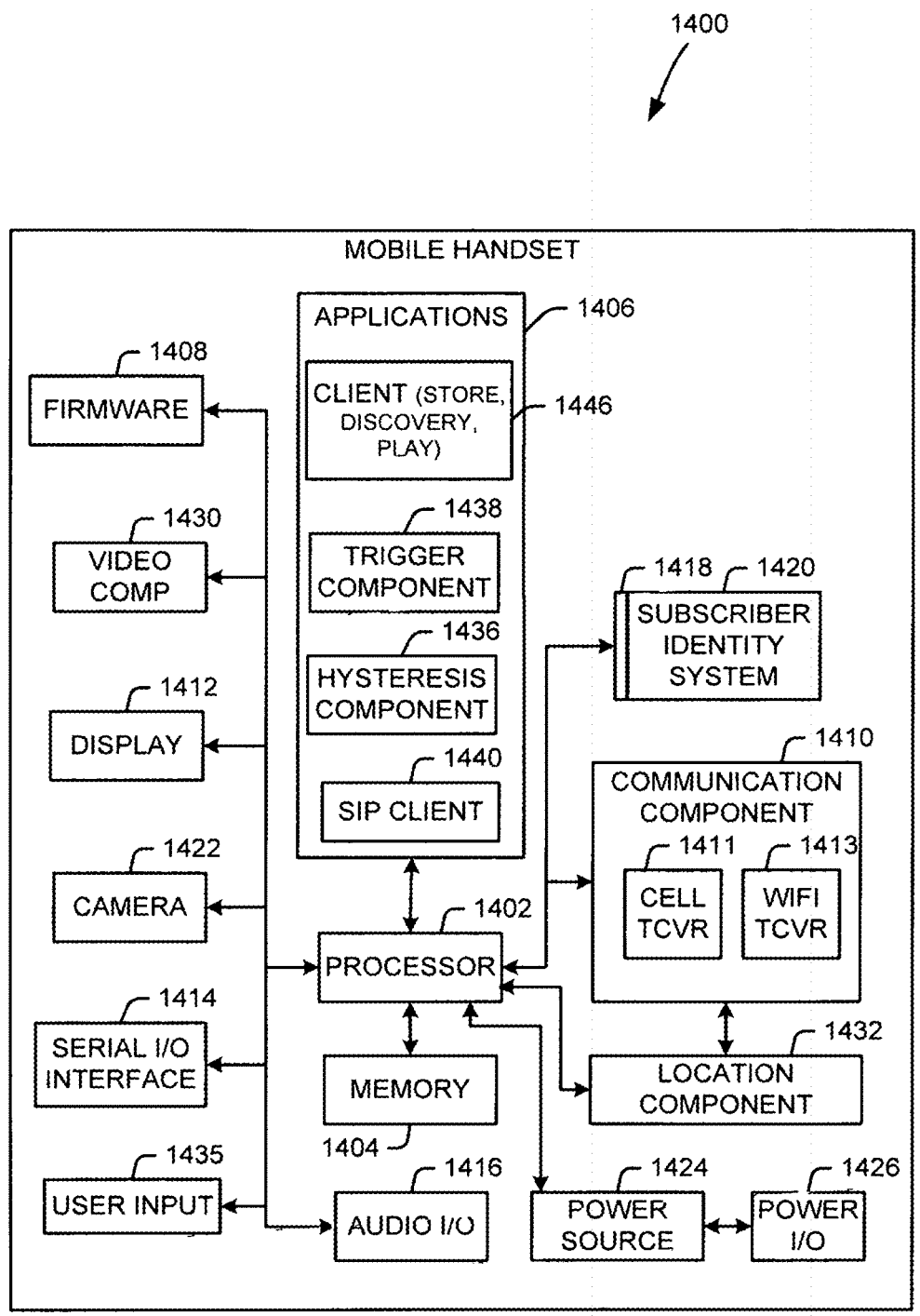
FIG. 14 illustrates an example block diagram of an example mobile handset operable to engage in a system architecture that facilitates wireless communications according to one or more embodiments described herein.

Referring now to FIG. 14, illustrated is an example block diagram of an example mobile handset 1400 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1494) through a hardwire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can he manufactured into the handset 1400, and updated by downloading data and software.

The handset 1400 can process IP data traffic through the communications component 1410 to accommodate IP traffic from an IP network such as, for example, the Internet, a corporate intranet, a home network, a person area network, etc., through an ISP or broadband cable provider. Thus, VoIP traffic can be utilized by the handset 1400 and IP-based multimedia content can be received in either an encoded or a decoded format.

A video processing component 1422 (e.g., a camera) can be provided for decoding encoded multimedia content. The video processing component 1422 can aid in facilitating the generation, editing, and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1436 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 1410, includes an indoor network radio transceiver 1413 (c.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
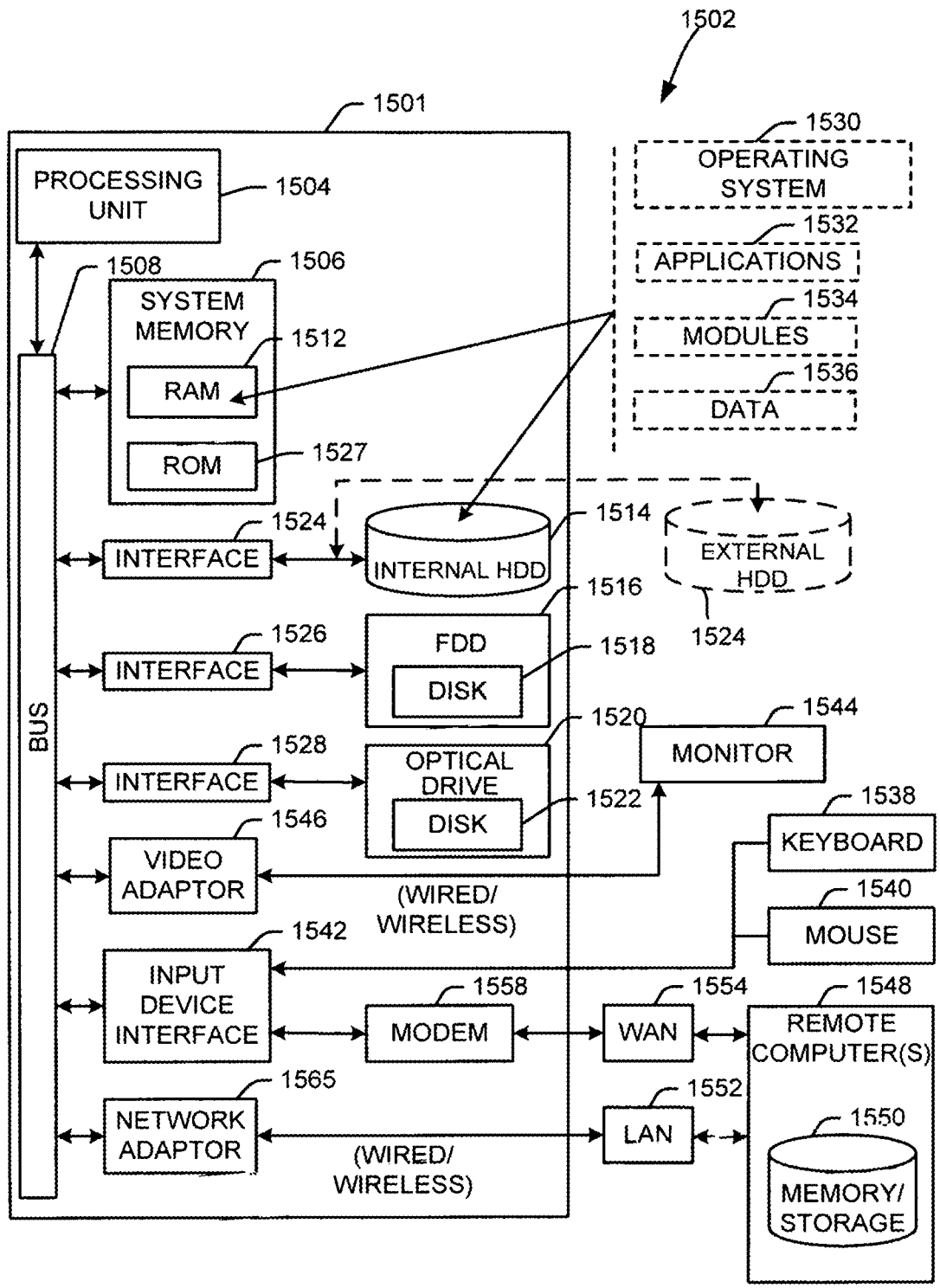
FIG. 15 illustrates an example block diagram of an example computer operable to engage in a system architecture that facilitates wireless communications according to one or more embodiments described herein.

Referring now to FIG. 15, illustrated is an example block diagram of an example computer 1500 operable to engage in a system architecture that facilitates wireless communications according to one or more embodiments described herein. The computer 1500 can provide networking and communication capabilities between a wired or wireless communication network and a server (e.g., Microsoft server) and/or communication device. In order to provide additional context for various aspects thereof, FIG. 15 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 15 is but one example of a computing device.

In order to provide a context for the various aspects of the disclosed subject matter, FIG. 15 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1520 (see below), non-volatile memory 1522 (see below), disk storage 1524 (see below), and memory storage 1546 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 15 illustrates a block diagram of a computing system 1500 operable to execute the disclosed systems and methods in accordance with an embodiment. Computer 1512, which can be, for example, part of the hardware of system 1520, includes a processing unit 1514, a system memory 1516, and a system bus 1518. System bus 1518 couples system components including, but not limited to, system memory 1516 to processing unit 1514. Processing unit 1514 can be any of various available processors. Dual microprocessors and other multiprocessor architectures also can be employed as processing unit 1514.

System bus 1518 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics , VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1594), and Small Computer Systems Interface (SCSI).

System memory 1516 can include volatile memory 1520 and nonvolatile memory 1522. A basic input/output system (BIOS), containing routines to transfer information between elements within computer 1512, such as during start-up, can be stored in nonvolatile memory 1522. By way of illustration, and not limitation, nonvolatile memory 1522 can include ROM, PROM, EPROM, EEPROM, or flash memory. Volatile memory 1520 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 can also include removable/non-removable, volatile/non-volatile computer storage media. FIG. 15 illustrates, for example, disk storage 1524. Disk storage 1524 includes, but is not limited to, devices like a magnetic disk drive, floppy disk drive, tape drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to system bus 1518, a removable or non-removable interface is typically used, such as interface 1526.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 15 describes software that acts as an intermediary between users and computer resources described in suitable operating environment 1500. Such software includes an operating system 1528. Operating system 1528, which can be stored on disk storage 1524, acts to control and allocate resources of computer system 1512. System applications 1530 lake advantage of the management of resources by operating system 1528 through program modules 1532 and program data 1534 stored either in system memory 1516 or on disk storage 1524. It is to be noted that the disclosed subject matter can be implemented with various operating systems or combinations of operating systems.

A user can enter commands or information into computer 1512 through input device(s) 1536. As an example, a mobile device and/or portable device can include a user interface embodied in a touch sensitive display panel allowing a user to interact with computer 1512. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1514 through system bus 1518 by way of interface port(s) 1538. Interface port(s) 1538 include, for example, a serial port, a parallel port, a game port, a universal serial bus (USB), an infrared port, a Bluetooth port, an IP port, or a logical port associated with a wireless service, etc. Output device(s) 1540 and a move use some of the same type of ports as input device(s) 1536.

Thus, for example, a USB port can be used to provide input to computer 1512 and to output information from computer 1512 to an output device 1540. Output adapter 1542 is provided to illustrate that there are some output devices 1540 like monitors, speakers, and printers, among other output devices 1540, which use special adapters. Output adapters 1542 include, by way of illustration and not limitation, video and sound cards that provide means of connection between output device 1540 and system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. Remote computer(s) 1544 can be a personal computer, a server, a router, a network PC, cloud storage, cloud service, a workstation, a microprocessor based appliance, a peer device, or other common network node and the like, and typically includes many or all of the elements described relative to computer 1512.

For purposes of brevity, only a memory storage device 1546 is illustrated with remote computer(s) 1544. Remote computer(s) 1544 is logically connected to computer 1512 through a network interface 1548 and then physically connected by way of communication connection 1550. Network interface 1548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1550 refer(s) to hardware/software employed to connect network interface 1548 to bus 1518. While communication connection 1550 is shown for illustrative clarity inside computer 1512, it can also be external to computer 1512. The hardware/software for connection to network interface 1548 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can he used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
   obtaining, by a network node comprising a processor, performance data corresponding to a performance criterion, and wherein the obtaining the performance data comprises obtaining at least a location of a user equipment in a cell;
   selecting, by the network node based on the performance data, a selected modulation and coding scheme table from a group of defined modulation and coding scheme tables configured for use by the user equipment, and wherein the selecting comprises selecting the selected modulation and coding scheme table based on at least the location of the user equipment in the cell; and
   facilitating configuring the user equipment with the selected modulation and coding scheme table for use by the user equipment in decoding physical shared channel transmissions.

2. The method of claim 1, wherein the selecting comprises selecting the selected modulation and coding scheme table based further on a transmission scheme from among a group of available transmission schemes comprising a closed loop transmission scheme and a semi-open loop transmission scheme.

3. The method of claim 1, wherein the group of defined modulation and coding scheme tables capable of being used by the user equipment comprise a 64 quadrature amplitude modulation and coding scheme table and a 256 quadrature amplitude modulation and coding scheme table.

4. The method of claim 1, wherein the selecting comprises selecting the selected modulation and coding scheme table based further on at least one of a first number of configured transmitting antenna ports that serve the user equipment, or a second number of receiving antennas at the user equipment.

5. The method of claim 1, wherein the selecting comprises selecting the selected modulation and coding scheme table based further on a geometry of the user equipment.

6. The method of claim 1, wherein the selecting comprises selecting the selected modulation and coding scheme table based further on a feedback reporting mode from a group of available feedback reporting modes, wherein the group of available feedback reporting modes comprise a wideband channel quality indicator reporting mode and a sub-band channel quality indicator reporting mode.

7. The method of claim 1, wherein the selecting comprises selecting the selected modulation and coding scheme table based further on a frequency band of transmission.

8. The method of claim 1, wherein the selecting comprises selecting the selected modulation and coding scheme table based further on at least one of a performance of the network node, or a base station transmission power.

9. The method of claim 1, wherein the selecting comprises selecting the selected modulation and coding scheme table based further on at least one of a deployment scenario in which the user equipment is operating, a radio environment of the user equipment, or on a user equipment recommendation regarding a channel quality indicator table.

10. The method of claim 1, wherein the selecting comprises selecting the selected modulation and coding scheme table based further on a type of service served by the network node.

11. The method of claim 1, wherein the selecting comprises selecting the selected modulation and coding scheme table based further on at least one of a transmission protocol a first number of configured antenna ports, a second number of receiving antennas at the user equipment, a geometry of the user equipment, a feedback reporting mode, a frequency band of transmission, a performance of the network node, a base station transmission power, a deployment scenario, a radio environment of the user equipment, a user equipment recommendation regarding a channel quality indicator table, or a type of service served by the network node.

12. The method of claim 1, wherein the facilitating configuring the user equipment with the selected modulation and coding scheme table for use by the user equipment in decoding physical shared channel transmissions corresponds to at least one of: physical downlink shared channel transmissions or physical uplink shared channel transmissions.

13. The method of claim 1, wherein the configuring the user equipment with the selected modulation and coding scheme table occurs as part of providing scheduling parameters from the network node to the user equipment for decoding the physical shared channel transmissions.

14. A radio network node, comprising:
a processor; and
a memory that stores executable instructions that, when executed by the processor, facilitate performance of operations, the operations comprising:
selecting, based on performance data, a selected modulation and coding scheme table from defined modulation and coding scheme tables capable of being used by a user equipment, wherein the performance data comprises at least a location of the user equipment in a cell, and the selecting comprises selecting the selected modulation and coding scheme table based at least on the user equipment location in the cell; and
configuring the user equipment with the selected modulation and coding scheme table for use by the user equipment in decoding physical shared channel transmissions.

15. The radio network node of claim 14, wherein the defined modulation and coding scheme tables capable of being used by the user equipment comprise a 64quadrature amplitude modulation and coding scheme and a 256 quadrature amplitude modulation and coding scheme table.

16. The radio network node of claim 14, wherein the selecting comprises selecting the selected modulation and coding scheme table based further on a geometry of the user equipment.

17. The radio network node of claim 14, wherein the selecting based on the performance data comprises selecting the selected modulation and coding scheme table based on at least one of: a transmission scheme, a number of configured antenna ports, or a number of receiving antennas at the user equipment.

18. A machine-readable storage medium, comprising executable instructions that, when executed by a processor of a network node, facilitate performance of operations, the operations comprising:
determining performance data, wherein the performance data comprises at least a location of a user equipment in a cell;
evaluating the performance data, and in response to the evaluating the performance data, selecting a modulation and coding scheme table from a group of defined modulation and coding scheme tables capable of being used by the user equipment, resulting in a selected modulation and coding scheme table, wherein the selecting comprises selecting the selected modulation and coding scheme table based at least on the user equipment location in the cell; and
configuring the user equipment with the selected modulation and coding scheme table.

19. The machine-readable storage medium of claim 18, wherein the selecting the modulation and coding scheme table comprises selecting the modulation and coding scheme table based on a geometry of the user equipment.

20. The machine-readable storage medium of claim 18, wherein the selecting the modulation and coding scheme table comprises selecting the modulation and coding scheme table based on at least one of: a feedback reporting mode, a frequency band of transmission, a performance of the network node, base station transmission power, a deployment scenario of the user equipment, a radio environment of the user equipment, or a user equipment recommendation regarding a channel quality indicator table.

* * * * *